(12) United States Patent
Hole et al.

(10) Patent No.: US 8,817,743 B2
(45) Date of Patent: Aug. 26, 2014

(54) SYSTEMS AND METHODS FOR INFORMING SERVING CELL OF TARGET CELL HANDOVER CAPABILITY

(75) Inventors: David Philip Hole, Slough (GB); Mo-han Fong, Ottawa (CA)

(73) Assignee: BlackBerry Limited, Waterloo (CA)

( * ) Notice: Subject to any disclaimer, the term of this patent is extended or adjusted under 35 U.S.C. 154(b) by 976 days.

(21) Appl. No.: 12/690,803

(22) Filed: Jan. 20, 2010

(65) Prior Publication Data

US 2011/0176509 A1  Jul. 21, 2011

(51) Int. Cl.
*H04W 4/00* (2009.01)
(52) U.S. Cl.
USPC .......................... 370/331; 370/328; 370/338
(58) Field of Classification Search
USPC .................................................. 370/331
See application file for complete search history.

(56) References Cited

U.S. PATENT DOCUMENTS

| | | | |
|---|---|---|---|
| 7,957,743 B2 | 6/2011 | Moe et al. | |
| 2006/0116118 A1 | 6/2006 | Charriere et al. | |
| 2007/0086388 A1* | 4/2007 | Kang et al. | 370/331 |
| 2008/0130585 A1 | 6/2008 | Park et al. | |
| 2008/0267153 A1 | 10/2008 | Mukherjee et al. | |
| 2009/0061881 A1 | 3/2009 | Gonsa et al. | |
| 2009/0163206 A1* | 6/2009 | Adatrao et al. | 455/436 |
| 2009/0291686 A1 | 11/2009 | Alpert et al. | |
| 2010/0027507 A1 | 2/2010 | Li et al. | |
| 2010/0075680 A1 | 3/2010 | Ramachandran et al. | |
| 2010/0165948 A1 | 7/2010 | Ore et al. | |
| 2010/0260147 A1 | 10/2010 | Xing et al. | |
| 2010/0290431 A1 | 11/2010 | Yang et al. | |
| 2010/0323704 A1 | 12/2010 | Tailor et al. | |
| 2011/0090857 A1 | 4/2011 | Guo | |
| 2011/0105119 A1* | 5/2011 | Bienas et al. | 455/436 |

FOREIGN PATENT DOCUMENTS

| | | |
|---|---|---|
| EP | 0933962 A2 | 8/2009 |
| WO | 2008/041115 A1 | 4/2008 |
| WO | 2008/131583 A1 | 11/2008 |

OTHER PUBLICATIONS

3GPP TS 44.060 V9.2.0 (Dec. 2009) Mobile Station (MS)—base station Stsem (MSS) Interface; Radio Link Control/Medium Access Control (RLC/MAC) protocol.*
Non-Final Office Action dated Oct. 7, 2011; in corresponding U.S. Appl. No. 12/690,750.
Partial International Search Report dated May 11, 2011 from PCT International Application No. PCT/EP2011/050410.

(Continued)

*Primary Examiner* — Derrick Ferris
*Assistant Examiner* — Kodzovi Acolatse
(74) *Attorney, Agent, or Firm* — Novak Druce Connolly Bove + Quigg LLP

(57) ABSTRACT

Systems and methods of informing a serving cell of a target cell handover capability are provided. In some cases, a mobile station determines whether inbound handover is possible and communicates this to the serving cell. The mobile station may make this determination based on broadcast information from the target cell. Alternatively, the mobile station may make this determination based on a message generated by a target cell controller that is sent to the mobile station through the serving cell. In another example, the mobile station construes the absence of a response to a cell change notification as an indication that inbound handover to the target cell is not possible.

19 Claims, 9 Drawing Sheets

(56) References Cited

OTHER PUBLICATIONS

LG Electronics Inc: "CSG Cell Detection" 3GPP Draft; R2-097012 CSG Cell Detection, 3rd Generation Partnership Project (3GPP), Mobile Competence Centre; 650, Route Des Ducioles, F-06921 Sophia-Antipolis Cedex; France, No. Jeju; 20091109, Nov. 9, 2009; XP050391385.
Partial International Search Report dated Mar. 30, 2011 from PCT International Application No. PCT/EP2011/050408.
Motorola Ltd et al.: "Definition of use of E_UTRAN_BA_IND and PSI3_CHANGE_MARK with E-UTRAN related information and other clarifications", 3GPP Draft, GP-091730 [GP-091713] CR_44060-REL-9 E-UTRAN_BA_IND, #rd Generation Partnership Project (3GPP), Mobile Competence Centre; 650, Route Des Lucioles; F-06921 Sophia-Antipolis Cedex; France, vol. TSG GERAN, no. Vancouver; 20090831, Sep. 4, 2009, XP050415754.
Nokia Corporation et al: "Measurement Reporting Parameters for CSG Cells" 3GPP Draft; GP-092022_CSG_PARAMETERS, 3rd Generation Partnership Project (3GPP), Mobile Competence Centre; 650, Route Des Lucioles; F-06921 Sophia-Antipolis Cedex; France, vol. TSG GERAN, no. Sophia, 20091116, Nov. 11, 2009, XP050415993.
Nokia Siemens Networks et al: "Signalling changes for CSG inbound mobility in connected mode", 3GPP Draft; FP-092023_DRAFT_CR_44060_CSG_SIGNALLING, 3rd Generation Partnership Project (3GPP), Mobile Competence Centre; 650, Route Des Lucioles; F-06921 Sophia-Antipolis Cedex; France, vol. TSG GERAN, no. Sophia, 20091116, Nov. 11, 2009, XP050415994.
R2-097000, "CSG inbound handover—way forward", NTT Docomo, 3GPP TSG-RAN WG2 #68, Jeju, Korea, Nov. 9-13, 2009.
GP-092382 "Working Assumptions on "Inbound Mobility to CSG Cells in Connected Mode"", (source 3GPP GERAN WG2), 3GPP TSG GERAN #44, Sophia Antipolis, France, Nov. 16-20, 2009.
R2-097445 CR 36.331-0258 rev 3 "Slight revision of baseline CR capturing agreements on inbound mobility", Samsung, 3GPP TSG-RAN WG2 #68, Jeju, Korea, Nov. 9-13, 2009.
R2-097466 CR 36.331-0318 rev 1 "Introduction of network ordered SI reporting", NTT Docomo, 3GPP TSG-RAN WG2 #68, Jeju, Korea, Nov. 9-13, 2009.
GP-092023 "Signalling Changes for CSG inbound mobility in connected mode" 3GPP TSG-3GPP GERAN #44, Sophia Antipolis, France, Nov. 16-20, 2009.
3GPP TS 44.060 (latest version is v.9.2.0) "General Packet Radio Service (GPRS); Mobile Station (MS)—Base Station System (BSS) interface; Radio Link Control / Medium Access Control (RLC/MAC) protocol". Release 9, Dec. 2009.
3GPP TS 45.008: "Radio subsystem link control". (latest version is v.9.1.0), Release 9, Nov. 2009.
3GPP TS 44.018 "Mobile radio interface layer 3 specification; Radio Resource Control Protocol". (latest version is 9.3.0), Release 9, Dec. 2009.

3GPP TS 48.008 "Mobile Switching Centre—Base Station System (MSC-BSS) interface; Layer 3 specification" (latest version is 9.1.0), Release 9, Dec. 2009.
3GPP TS 43.129 Packed-switched handover for GERAN A/Gb mode; Stage 2 (defines Handover Preparation; latest version is 9.0.0), Release 9, Dec. 2009.
3GPP TS 48.018 "General Packet Radio Service (GPRS); Base Station System (BSS)—Serving GPRS Support Node (SGSN); BSS GPRS protocol (BSSGP)" (latest version is 9.0.0), Release 9, Dec. 2009.
3GPP TS 23.009—V9.0.0, Technical Specification Group Core Network and Terminals; Handover procedures, Release 9, Dec. 2009.
3GPP TS 23.008—V9.1.0, Technical Specification Group Core Network and Terminals;Organization of subscriber data, Release 9, Dec. 2009.
3GPP TS 25.304—V9.0.0, Technical Specification Group Radio Access Network; User Equipment (UE) procedures in idle mode and procedures for cell reselection in connected mode, Release 9, Dec. 2009.
3GPP TS 36.304—V9.1.0, Technical Specification Group Radio Access Network; Evolved Universal Terrestrial Radio Access (E-UTRA); User Equipment (UE) procedures in idle mode, Release 9, Dec. 2009.
3GPP TS 36.104—V9.2.0, Technical Specification Group Radio Access Network; Evolved Universal Terrestrial Radio Access (E-UTRA); Base Station (BS) radio transmission and reception, Release 9, Dec. 2009.
3rd Generation Partnership Project; Technical Specification Group Services and System Aspects; 3GPP System Architecture Evolution: Report on Technical Options and Conclusions (Release 7), 3GPP TR 23.882, V1.4.2, (Oct. 2006).
3rd Generation Partnership Project; Technical Specification Group Services and System Aspects; Voice Call Continuity (VCC) between Circuit Switched (CS) and IP Multimedia Subsystem (IMS); Stage 2 (Release 7), 3GPP TS 23.206, V7.0.0, (Sep. 2006).
3rd Generation Partnership Project; Technical Specification Group GERAN; Packet-switched handover for GERAN A/Gb mode; Stage 2 (Release 6), 3GPP TS 43.129 V6.9.0 (Sep. 2006).
3GPP: 3GPP Technical Specification Mobile radio interface layer 3 specification; Radio Resource Control (RRC) protocol (Release 9) 3GPP TS44.018 V9.3.0, Dec. 1, 2009, pp. 1, 164-169, XP002624705, Retrieved from the Internet: URL: http://www.3gpp.org/ftp/Specs/archive/44_series/44.018/44018-930.zip [retrived on Feb. 1, 2011] chapter 9.1.15.
International Search Report and Written Opinion dated Mar. 22, 2011 from PCT International Application No. PCT/EP2011/050411.
Inter BSC-Intra MSC Handover Call Flow (Dec. 4, 2004); retrieved Dec. 13, 2005 from: http//www.eventhelix.com/RealtimeMantra/Telecom/GSM Handover Call Flow.
Examination Report mailed Oct. 4, 2013, in corresponding European patent application No. 11700413.5.

* cited by examiner

SYSTEMS AND METHODS FOR INFORMING SERVING CELL OF TARGET CELL HANDOVER CAPABILITY

FIELD

The application relates to handover in cellular communications system.

BACKGROUND

Some cells are uncontrolled in the sense that a PLMN (public land mobile network) operator does not control the location and/or operation of the cell. Other cells are controlled in the sense that the operator does control the both the location and operation of the cells. Examples of uncontrolled cells include, for example, CSG (closed subscriber group) cells, cells controlled by home enode b's and home node b's. These cells are also sometimes referred to as being "uncoordinated" in the sense that they are not subject to normal radio/cell planning.

It is generally understood that there are many methods of performing a handover for controlled cells. Inbound handover in this context refers to a cell change from a target cell's perspective where resources (for example timeslots, frequency channels, scrambling codes, etc.) for transmission and/or reception in the cell are allocated to a mobile station in advance of the mobile station performing a cell change to that cell, particularly in response to a request from the controller of the device's serving cell.

While the uncontrolled cells may be configured to use spectrum that is owned by the operator, the network operator does not have the same control over uncontrolled cells as for controlled cells. Typically, the network operator does not own the support structure (towers etc.), does not own or control the backhaul connection (e.g. Digital Subscriber Line (DSL) connections), does not know or control when a given uncontrolled cell is going to be switched on, and may not know or control the locations of uncontrolled cells. The operator will typically still have control of various parameters such as operating frequency, transmit power, etc. if the operator owns the spectrum license.

In order to perform a handover to a target cell, controlled or uncontrolled, a MS (mobile station) typically needs to provide identifying information relating to the target cell to the current serving cell so that it can initiate a handover process. In particular, the current serving cell needs to be able to communicate with (possibly via a core network) the cell controller for the target cell. However, the current serving cell may not be aware of how to reach the cell controller for the target cell, particularly if the target cell is an uncontrolled cell, unless provided with explicit identification information for the cell (such as a cell global identity). This makes handover to such cells difficult. In contrast, for a controlled target cell, it may be sufficient for the mobile station to provide the current serving cell with information about the target cell. This does not require or cause the acquisition of any broadcast information from the target controlled cell for the serving cell to be able to reach the cell controller for the target controlled cell, since the serving cell or some part of the network may be able to map other identifying features of the cell (such as operating frequency, scrambling code etc.) to the identity of the target cell or its controller.

BRIEF DESCRIPTION OF THE DRAWINGS

Embodiments of the application will now be described with reference to the attached drawings in which.

DETAILED DESCRIPTION OF THE PREFERRED EMBODIMENTS

Figure 1:
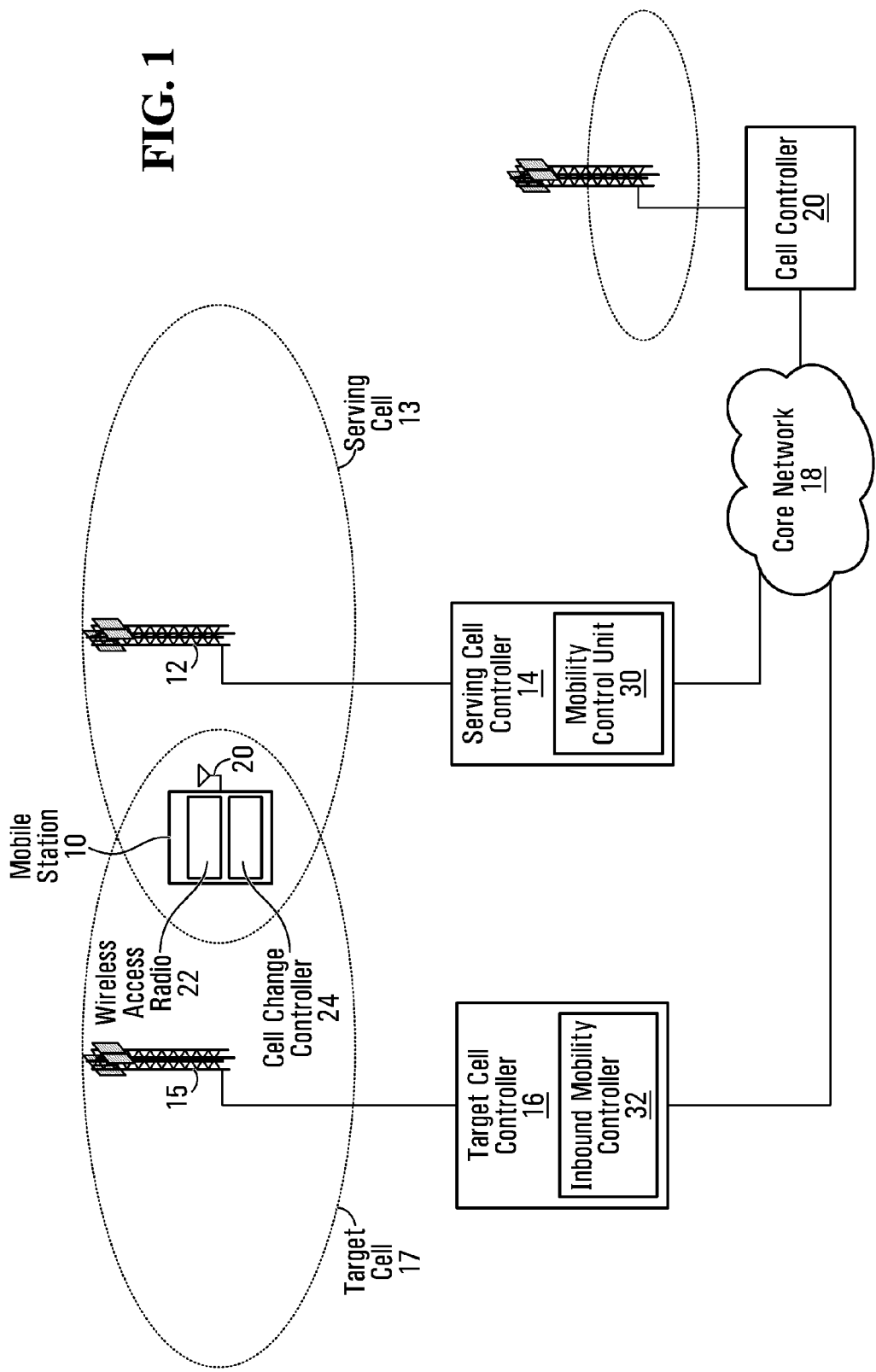
FIG. 1 is a schematic diagram of a mobile station, serving cell and target cell.

It should be understood at the outset that although illustrative implementations of one or more embodiments of the present disclosure are provided below, the disclosed systems and/or methods may be implemented using any number of techniques, whether or not currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For some uncontrolled cells, inbound handover may not be supported in respect of the cells. For other uncontrolled cells, inbound handover is supported in respect of the cells. This may be because, for example, the respective cell controller is not capable (i.e. does not support) of performing the required steps in the handover procedure, or another network element (such as a core network node) does not support the necessary functionality. Additionally or alternatively, handover to a particular cell may be disabled (or not enabled).

For uncontrolled cells in particular, the serving cell is unlikely to be aware of target cell handover capability. In particular, it is unlikely that a serving cell controller will have a priori knowledge of whether a given uncontrolled cell supports inbound handover. The serving cell may be able to determine this after the handover preparation (of which the above-referenced allocation of resources in the target cell in advance of the cell change forms a part) has failed if an appropriate cause value is returned; however, it is unlikely that the serving cell would then store this information and therefore avoid handover preparation attempts to this cell in future.

Delays and wasted signalling may arise if the serving cell controller or the mobile station incorrectly assumes that a target cell supports incoming handover. For example, the serving cell controller may:

initiate handover preparation towards the target cell controller which will not be successful; and/or request or trigger the MS to perform SI (system information) acquisition of the target cell and/or transmit some of the acquired system information to the serving cell controller; and/or attempt multiple handover preparations towards multiple cells until a successful preparation phase is achieved.

Furthermore, excessive delays may cause the MS to lose coverage in the serving cell and/or have such poor channel conditions that any handover command (or other control message) is not received correctly.

Generally, the problem of not knowing whether a target cell supports handover may exist for any type of target cell, including both uncontrolled cells, and controlled cells. However, it is much more problematic for uncontrolled cells, This is because it is unlikely that network controllers will have stored information about the possibility to complete a handover towards particular target uncontrolled cells, whereas storing such information in respect of controlled cells is more straightforward. Furthermore, the penalty of incorrectly assuming that a target uncontrolled cell supports inbound handover is high due to the numerous additional steps required of the MS which may be triggered in preparation for such a handover.

In the description that follows, cell controller is a generic term which could, for example, refer to base station controllers (BSC), radio network controllers (RNC) or eNodeB (eNB) or Home eNodeB; generally for the purpose of this description, it is used to mean an entity which controls the cell in some sense. For example, a cell controller might be an entity which initiates a handover preparation procedure for a mobile station ("serving cell controller") or which allocates resources in a target cell as part of a handover procedure ("target cell controller"). The serving cell controller may, for example, be responsible for processing measurement reports, cell change notifications and similar messages received from a mobile station and based on these (and other implementation-specific considerations) generating mobility commands (such as packet cell change order messages) to be transmitted to the mobile station and/or initiating handover preparation. A GERAN BSS is an example. The same entity or entities may function as a serving cell controller in respect of the cell when performing a serving cell role and a target cell controller when the same cell is performing a target cell role. A cell controller may perform the control function for one or multiple cells. In some cases, a cell controller performs the control function for one cell and is co-located with other cell components, such as a component containing a wireless transceiver, such as a base station. A cell controller may be a part of a BSS (base station subsystem) which includes the transceiver. References to a cell sending or receiving something refer to a wireless transceiver sending or receiving something, possibly under control of the cell controller of the cell.

Referring to FIG. 1, shown is a schematic diagram in which a mobile station 10 has a wireless connection to a serving cell transceiver 12 within serving cell 13. Also shown is a serving cell controller 14, target cell transceiver 15 within target cell 17, and target cell controller 16. Of course, other network elements may be present, such as core network elements 18 and other cell controllers 20. The core network elements may, for example, include one or more of an SGSN (serving GPRS support node), MSC (mobile switching centre), MME (mobility management entity). The signalling over the air interface (between a transceiver and a mobile station) is typically performed at the RLC (radio link control)/MAC (medium access control) layer. Signalling between a BSS and core network is separate from RLC/MAC.

The serving cell controller 14 is configured with a mobility control unit 30 that enables the serving cell controller to perform one or a combination of two or more of the serving cell controller methods described herein. The mobility control unit 30 may be implemented in hardware, or software running on a processing platform such as a processor or combination of processors, or a combination of hardware and software. The mobility control unit 30 may be implemented as part of/a change to another component forming part of a serving cell controller. The serving cell controller 14 includes other components (not shown) to allow it to perform the serving cell controller functionality.

The target cell controller 16 is configured with an inbound mobility controller 32 that enables the target cell controller to perform one or a combination of two or more of the target cell controller methods described herein. The inbound mobility controller 32 may be implemented in hardware, or software running on a processing platform such as a processor or combination of processors, or a combination of hardware and software. The inbound mobility controller 32 may be implemented as part of/a change to another component forming part of a target cell controller. The target cell controller 16 includes other components (not shown) to allow it to perform the target cell controller functionality.

A cell controller may be implemented that includes both the mobility control unit 30 and the inbound mobility controller 32.

The mobile station 10 has at least one antenna 20, and at least one wireless access radio 22. In addition, them mobile station is configured with a cell change controller 24 that enables the mobile station to perform one or a combination of two or more of the mobile station methods described herein. The cell change controller 24 may be implemented in hardware, or software running on a processing platform such as a processor or combination of processors, or a combination of hardware and software. The cell change controller 24 may be implemented as part of/a change to another component forming part of a mobile station. The mobile station 10 includes other components (not shown) to allow it to perform mobile station functionality.

Various methods embodiments that comprise methods implemented by a mobile station or cell controller will now be described with reference to FIGS. 3 to 16. For each method, unless clearly necessary for the method to function, it is not necessary that the steps be executed in the sequence depicted or described.

Figure 3:
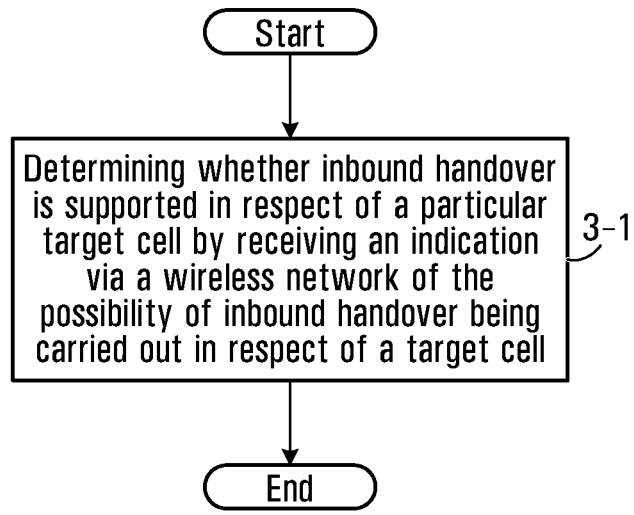
FIGS. 3 to 16 are flowcharts of methods for execution by a mobile station or cell controller.

FIG. 3 is a flowchart of a method executed by a mobile station. The method involves determining whether inbound handover is supported in respect of a particular target cell by receiving an indication via a wireless network of the possibility of inbound handover being carried out in respect of a target cell in block 3-1.

Figure 4:
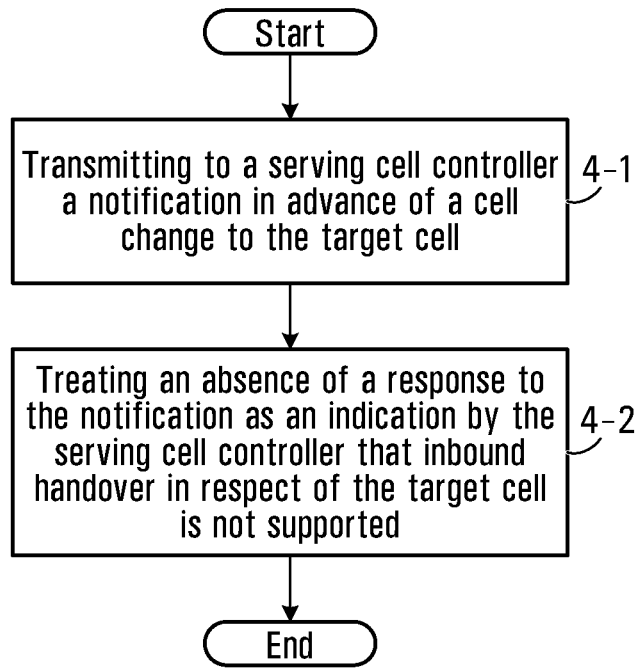

FIG. 4 is a flowchart of a method executed by a mobile station. The method involves determining whether inbound handover is supported in respect of a particular target cell by:

transmitting to a serving cell controller a notification in advance of a cell change to the target cell (block 4-2) and treating an absence of a response to the notification as an indication by the serving cell controller that inbound handover in respect of the target cell is not supported (block 4-3).

Figure 5:
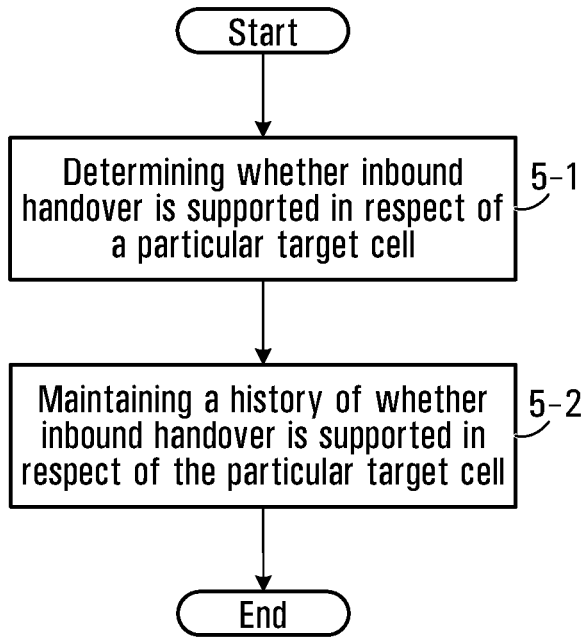

FIG. 5 is a flowchart of a method executed by a mobile station. The method involves determining whether inbound handover is supported in respect of a particular target cell (block 5-1) and maintaining a history of whether inbound handover is supported in respect of the particular target cell (block 5-2).

Figure 6:
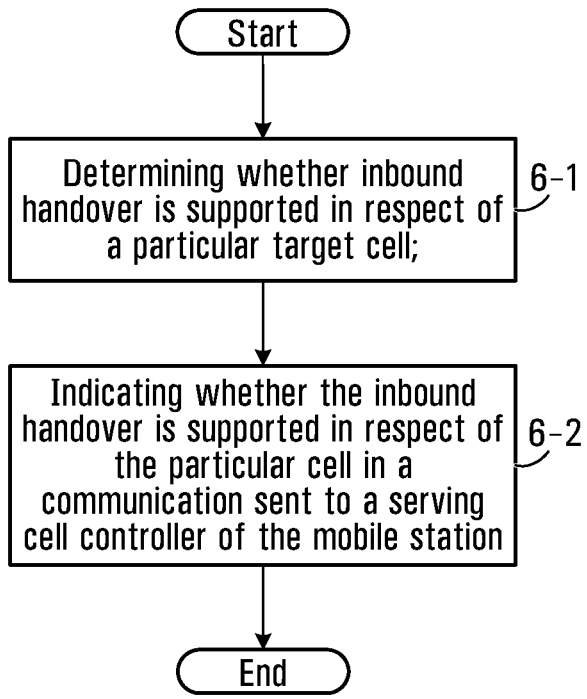

FIG. 6 is a flowchart of a method executed by a mobile station. The method involves determining whether inbound handover is supported in respect of a particular target cell (block 6-1) and indicating whether the inbound handover is supported in respect of the particular cell in a communication sent to a serving cell controller of the mobile station (block 6-2).

Figure 7:
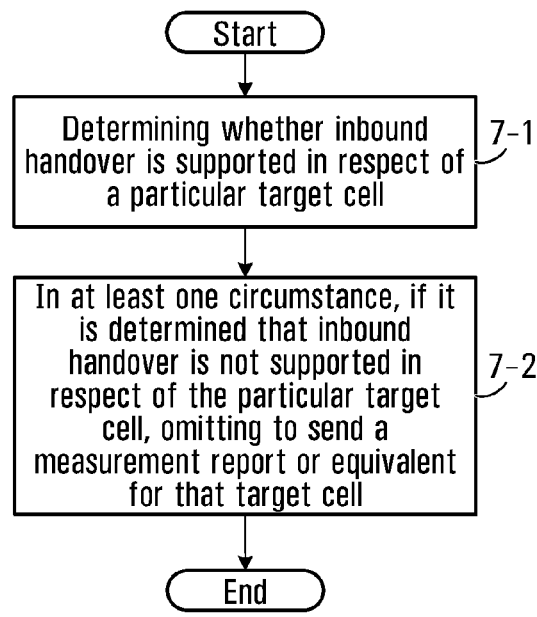

FIG. 7 is a flowchart of a method executed by a mobile station. The method involves determining whether inbound handover is supported in respect of a particular target cell (block 7-1) and in at least one circumstance, if it is determined that inbound handover is not supported in respect of the particular target cell, omitting to send a measurement report or equivalent for that target cell (block 7-2).

Figure 8:
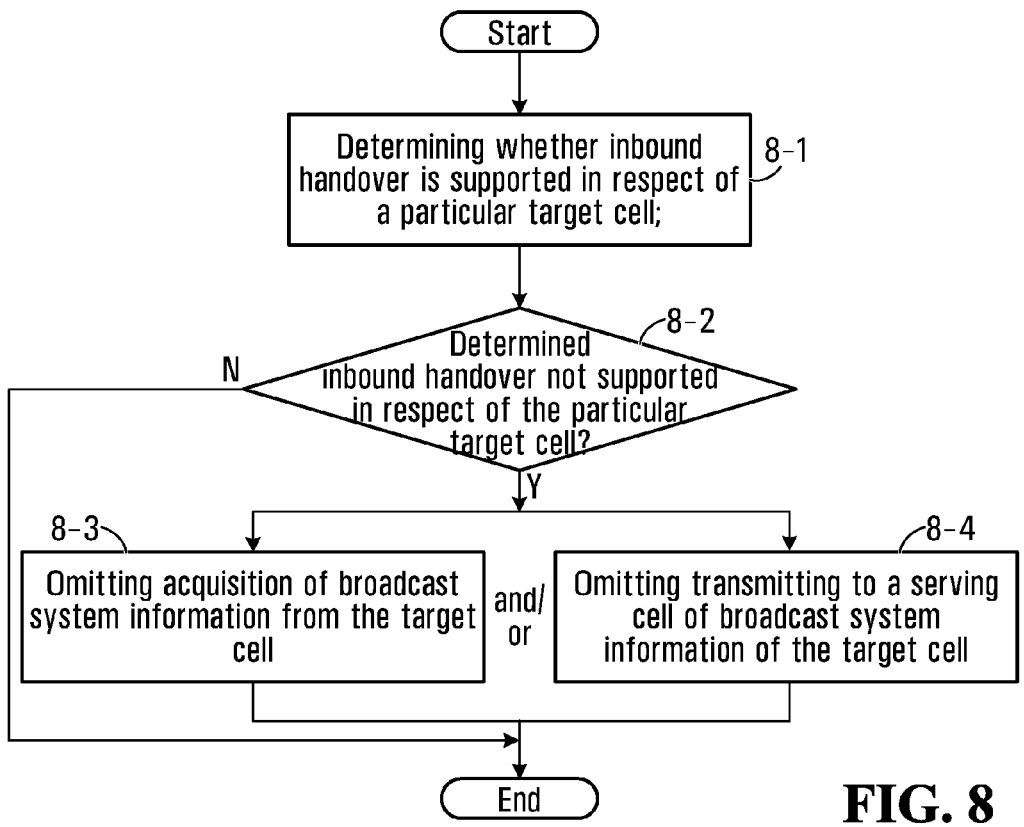

FIG. 8 is a flowchart of a method executed by a mobile station. The method involves determining whether inbound handover is supported in respect of a particular target cell (block 8-1). If it is determined that inbound handover is not supported in respect of the particular target cell (yes path block 8-2) performing at least one of omitting acquisition of broadcast system information from the target cell (block 8-3)

omitting transmitting to a serving cell broadcast system information of the target cell (block 8-4).

Figure 9:
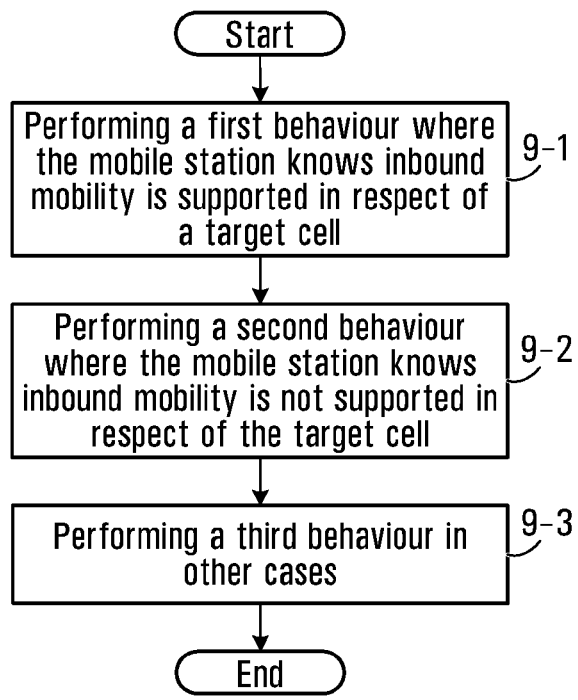

FIG. 9 is a flowchart of a method executed by a mobile station. The method involves performing a first behaviour where the mobile station knows inbound mobility is supported in respect of a target cell (block 9-1); performing a second behaviour where the mobile station knows inbound mobility is not supported in respect of the target cell (block 9-2); and performing a third behaviour in other cases (block 9-3).

Figure 10:
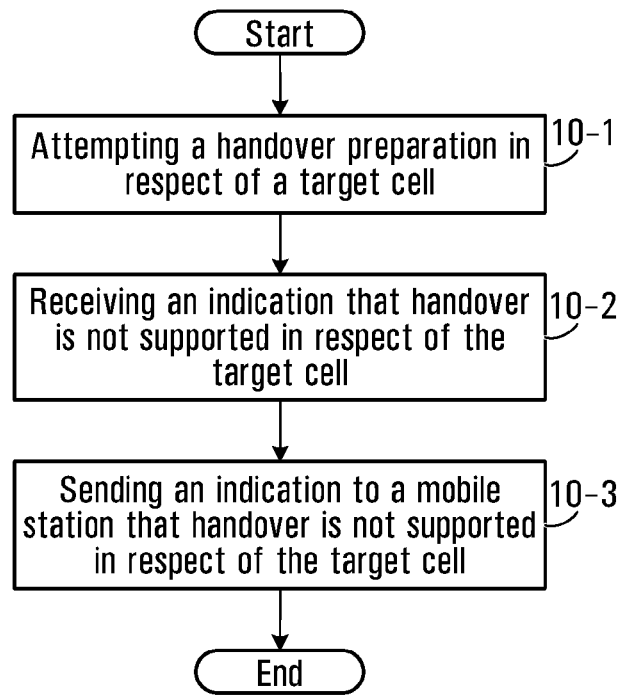

FIG. 10 is a flowchart of a method executed by a serving cell controller. The method involves attempting a handover preparation in respect of a target cell (block 10-1); receiving an indication that handover is not supported in respect of the target cell (block 10-2); sending an indication to a mobile station that handover is not supported in respect of the target cell (block 10-3).

Figure 11:
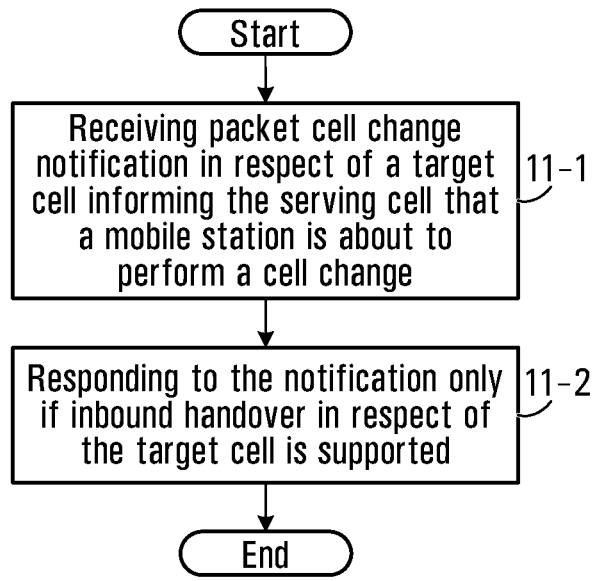

FIG. 11 is a flowchart of a method executed by a serving cell controller. The method involves receiving packet cell change notification in respect of a target cell informing the serving cell that a mobile station is about to perform a cell change (block 11-1; and responding to the notification only if inbound handover in respect of the target cell is supported (block 11-2).

Figure 12:
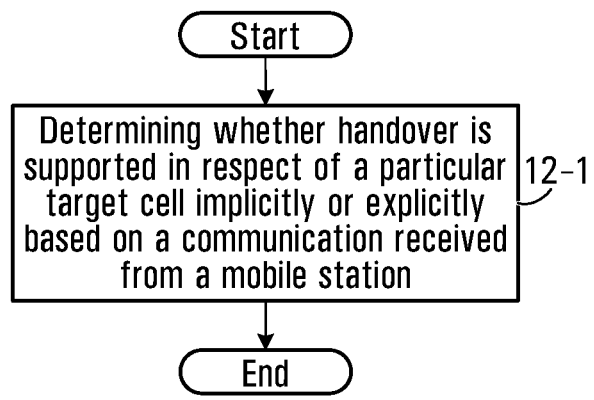

FIG. 12 is a flowchart of a method executed by a serving cell controller. The method involves determining whether handover is supported in respect of a particular target cell implicitly or explicitly based on a communication received from a mobile station (block 12-1).

Figure 13:
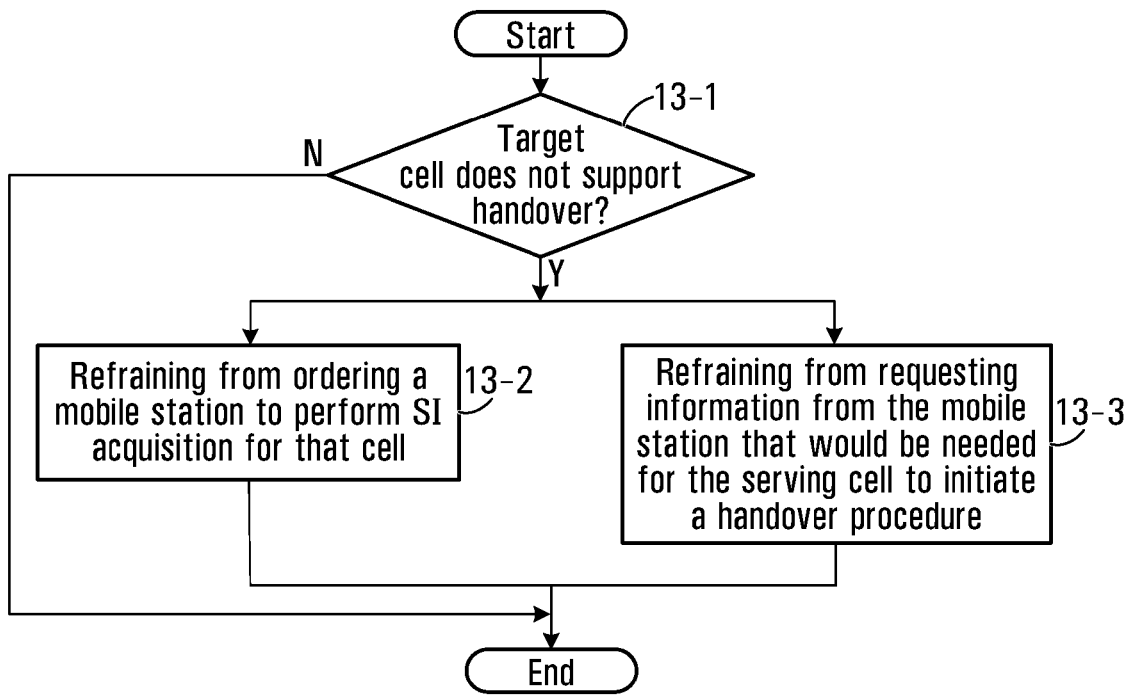

FIG. 13 is a flowchart of a method executed by a serving cell controller. The method involves if it is determined that a target cell does not support handover (yes path block 13-1), at least one of refraining from ordering a mobile station to perform SI acquisition for that cell (block 13-2) and refraining from requesting information from the mobile station that would be needed for the serving cell to initiate a handover procedure (13-3).

Figure 14:
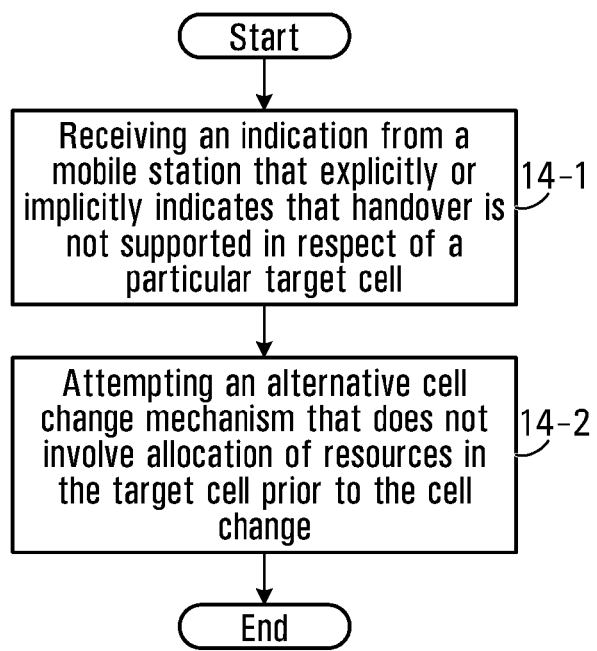

FIG. 14 is a flowchart of a method executed by a serving cell controller. The method involves receiving an indication from a mobile station that explicitly or implicitly indicates that handover is not supported in respect of a particular target cell (block 14-1); attempting an alternative cell change mechanism that does not involve allocation of resources in the target cell prior to the cell change (block 14-2).

Figure 15:
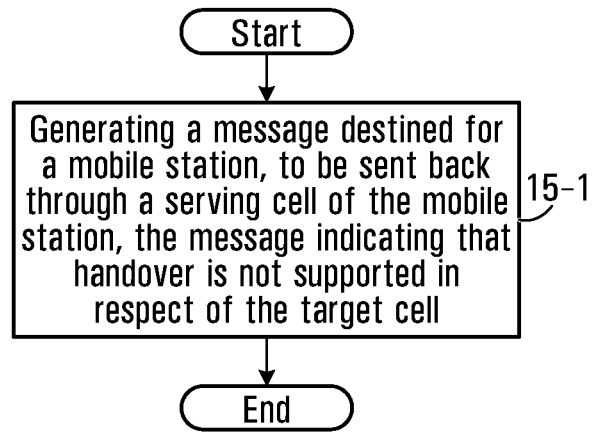

FIG. 15 is a flowchart of a method executed by a target cell controller. The method involves generating a message destined for a mobile station, to be sent back through a serving cell of the mobile station, the message indicating that handover is not supported in respect of the target cell (block 15-1).

Figure 16:
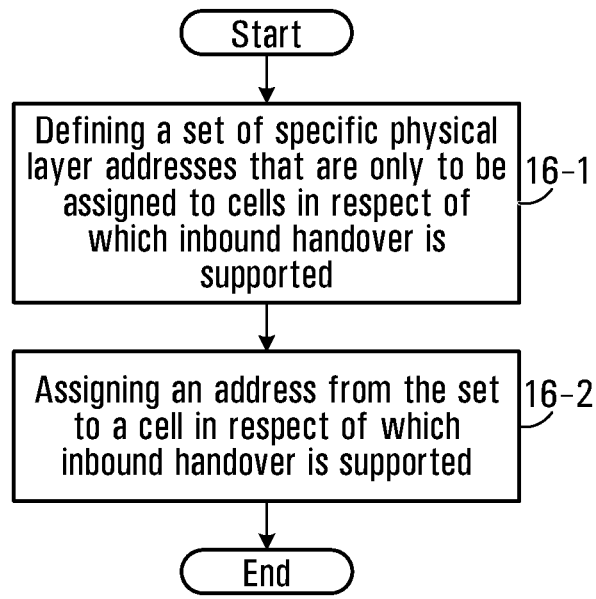

FIG. 16 is a flowchart of a method of signifying that inbound handover is not supported in respect of certain cells. The method involves defining a set of specific physical layer addresses that are only to be assigned to cells in respect of which inbound handover is supported (block 16-1); assigning an address from the set to a cell in respect of which inbound handover is supported (block 16-2).

Further embodiments provide computer readable media having computer executable instructions stored thereon, that when executed by an appropriate processing device, such as a mobile device or a cell controller, execute any one or more of the methods described herein.

Detailed examples of the above-described methods will now be described.

Methods of Enabling a MS to Determine that Handover to a Particular Target Cell is not Possible.

Methods and systems are provided that enable a MS to determine that handover to a particular target cell is not possible. In some embodiments, these methods are applied specifically to uncontrolled cells, or to a particular type of uncontrolled cells. This is assumed to be the case in the detailed discussion that follows. However, more generally, even though the examples below refer to uncontrolled cells, these methods are not limited to uncontrolled cells. However, the benefits may be more significant for uncontrolled cells. Various uses of this knowledge are provided later on in the description. In some embodiments, an indication of lack of support for inbound handover in respect of a target cell is an indication of lack of support for the inbound handover for unspecified causes. In other embodiments, lack of support for inbound handover in respect of a target cell indicates lack of support in a particular entity or entities, such as the target cell controller and/or a core network element.

Target Cell Transmits Indication of Support for Inbound Handover

In some embodiments, an uncontrolled cell is configured to transmit an indication of whether or not it supports inbound handover, for example as part of system information broadcast by the uncontrolled cell. The mobile station receives this directly from the target cell and then decodes this information.

Serving Cell Sends Indication that Handover Preparation Failed Because Target Cell does not Support Inbound Handover In some embodiments, a serving cell controller sends an indication to the mobile station that a handover preparation attempt failed because the target controller does not support handover. The mobile station receives this information.

Examples of this indication are provided below where the indication is included a packet cell change continue message or a packet cell change order message although it should be clearly understood that this is not an exhaustive list, and any mechanism of sending the indication can be employed. Other options would be, for example, to include in a PACKET MEASUREMENT ORDER message a list of target cells (for E-UTRAN, this may be frequency and PCI (physical layer cell identity)) that do not support inbound handover. To avoid confusion (in case there are multiple cells with the same frequency and PCI in the region) some care is required to avoid ambiguity. In some embodiments, the network only includes this indication after the handover preparation had been attempted, and the mobile station would be responsible for determining whether, when it detects a cell with the same frequency and PCI, it is the same cell. Another possibility is that the network stores some context information e.g. based on the set of cells being reported at the same time by a mobile, to identify a cell even before SI is acquired/sent by the mobile station. In this case, the network can avoid requesting SI acquisition by the mobile.

In some embodiments, if the network is aware that PS (packet switched) handover towards either the target cell indicated in the packet cell change notification message or (if different) the one indicated in the packet cell change order message is not possible due to lack of support for the procedure in the target system (including target RAN (radio access network) nodes or target core network nodes, and including the case where the network attempted such a handover which was unsuccessful and either the received cause value indicated lack of support of the target system or some other network entity or no response was received, the network indicates this in the packet cell change continue message or packet cell change order message, as applicable. On receipt of this information, the mobile station stores it together with other stored information for the target cell. In some embodiments, a lack of response to the handover attempt by the network is also interpreted as handover not being supported in respect of the target cell, in which case the network indicates this as above.

Packet Cell Change Continue

A packet cell change continue is a message that may be sent, for example on the PACCH, by the network to the mobile station to command the mobile station to continue the cell reselection procedure. An example is the Packet Cell Change Continue message defined in 11.2.2a of 3GPP TS 44.060, but other implementations are possible, and the embodiment described is not limited to the particular definition.

In some embodiments, the packet cell change continue message includes a field that indicates whether the indicated target cell in the packet cell change notification message most recently transmitted by the MS supports inbound handover for mobile stations in packet transfer mode.

The following is a specific example of a packet cell change continue message definition that includes such a field, shown as a modified version of the PCCC message defined in 11.2.23 of 3GPP TS 44.060. Following that is a table containing example information element definitions shown as changes from 11.2.2a of 3GPP TS 44.060.

Message type: PACKET CELL CHANGE CONTINUE
Direction: network to mobile station
Classification: non-distribution message TABLE 11.2.2a

| 1: PACKET CELL CHANGE CONTINUE message content |
| --- |
| < Packet Cell Change Continue message content > ::=<br>  < PAGE_MODE : bit (2) ><br>  { 0 < GLOBAL_TFI : Global TFI IE ><br>  { { 0 \| 1 < ARFCN : bit (10) ><br>    < BSIC : bit (6) ><br>    < CONTAINER_ID : bit (2) > }<br>    { null \| 0 bit** = <no string > -- Receiver backward compatible<br>with earlier version<br>    \| 1 -- Additions for Rel-9<br>    < PCCN_TGT_PSHO_SUPPORT : bit (1) >   < padding<br>    bits > }<br>  ! < Non-distribution part error : bit (*) = < no string > > }<br>  ! < Address information part error : bit (*) = < no string > > }<br>  ! < Distribution part error : bit (*) = < no string > > ; |

| 2: PACKET CELL CHANGE CONTINUE information element details |
| --- |
| PCCN_TGT_PSHO_SUPPORT (1 bit field)<br>This field indicates whether the indicated target cell in |

TABLE 11.2.2a-continued the most recently transmitted PACKET CELL CHANGE NOTIFICATION message supports inbound handover for mobile stations in packet transfer mode. If set to '1', the target cell does not support inbound handover; if set to '0', the support is not known.

Packet Cell Change Order

A packet cell change order is a message which may, for example, be sent on the PCCCH or PACCH by the network to the mobile station to command the mobile station to leave the current cell and change to a new cell. An example of such a message is the Packet Cell Change Order (PCCO) message defined in 11.2.4 of 3GPP TS 44.060, but other implementations are possible, and the embodiment described is not limited to the particular definition. For a (3G) multi-RAT mobile station the new cell may be a 3G Cell. For a (E-UTRAN) multi-RAT mobile station the new cell may be an E-UTRAN cell.

In some embodiments, a packet cell change order is sent that includes an indication of whether the indicated target cell supports inbound handover for mobile stations in packet transfer mode. In some embodiments, this field is used to selectively indicate that the target cell does not support inbound handover, or that the support is not known. The TGT_PSHO_SUPPORT field included in the detailed example described below is a specific example.

In some embodiments, a packet cell change order is sent that includes an indication of whether the indicated target cell in a most recently transmitted packet cell change notification message (a message from a mobile station informing the serving cell that it is about to perform a cell change) supports inbound handover for mobile stations in packet transfer mode. In some embodiments, this field is used to selectively indicate that the target cell does not support inbound handover, or that the support is not known. The PCCN_TGT_PSHO_SUPPORT field included in the detailed example described below is a specific example.

The following is a specific example of a packet cell change order shown as amendments to the definition of the Packet Cell Change Order defined in 11.2.4 of 3GPP TS 44.060. Also shown is a set of information elements, again as changes from the definitions in 11.2.4 of 3GPP TS 44.060.

Message type: PACKET CELL CHANGE ORDER
Direction: network to mobile station
Classification: non-distribution message

TABLE 11.2.4

| 1: PACKET CELL CHANGE ORDER message content |
| --- |
| < Packet Cell Change Order message content > ::=<br>  < PAGE_MODE : bit (2) ><br>  { { 0 < Global TFI : < Global TFI IE > ><br>   \| 10 < TLLI / G-RNTI : bit (32) > }<br>  { 0<br>    { < IMMEDIATE_REL : bit ><br>    < GSM target cell: < GSM target cell struct >><br>    ! < Non-distribution part error : bit (*) = < no string > > }<br>   \| 1<br>   { 00 -- Message escape<br>    { < IMMEDIATE_REL : bit ><br>    { 0 \| 1 < UTRAN FDD Target cell: < UTRAN FDD Target cell IE > > }<br>    { 0 \| 1 < UTRAN TDD Target cell: < UTRAN TDD Target cell IE > > }<br>    { null \| 0 bit ** = < no string > -- Receiver compatible with earlier<br>release<br>   \| 1 -- Additions in Rel-5 :<br>    { 0 \| 1 < G-RNTI extension : bit (4) > }<br>    { null \| 0 bit ** = < no string > -- Receiver compatible with earlier<br>release<br>   \| 1 -- Additions in Rel-8 |

TABLE 11.2.4-continued

```
        { 0 | 1 < E-UTRAN Target cell : < E-UTRAN Target cell IE >> }
        { 0 | 1 < Individual Priorities : < Individual Priorities IE >> }
          < padding bits > } }
    ! < Non-distribution part error : bit (*) = < no string > > }
   ! < Message escape : { 01 | 10 | 11} bit (*) = <no string> > } }
   ! < Address information part error : bit (*) = < no string > > }
  ! < Distribution part error : bit (*) = < no string > > ;
< GSM target cell struct > ::=
 < ARFCN : bit (10) >
 < BSIC : bit (6) >
 < NC Measurement Parameters : < NC Measurement Parameters struct > >
 { null | 0 bit ** = < no string > -- Receiver compatible with earlier release
 | 1 -- Additions in release 98 :
   { 0 | 1 < LSA Parameters : < LSA Parameters IE >> }
   { null | 0 bit ** = < no string > -- Receiver compatible with earlier release
   | 1 -- Additions in release 99 :
     < ENH Measurement parameters : < ENH Measurement parameters struct >>
     { null | 0 bit ** = < no string >    -- Receiver compatible with earlier release
     | 1 -- Additions in Rel-4 :
       < CCN_ACTIVE : bit (1) >
       { 0 | 1 < CONTAINER_ID : bit (2) > }
       { 0 | 1 < CCN Support Description : < CCN Support Description struct >> }
       { null | 0 bit ** = < no string >   -- Receiver compatible with earlier
release
       | 1    -- Additions in Rel-5 :
         { 0 | 1 < G-RNTI extension : bit (4) > }
         { 0 | 1 < Iu Mode Neighbour Cell Parameters : { 1 < Iu Mode Neighbour Cell
params struct > } ** 0 > }          --Supplementary information for dual Iu
mode and A/Gb mode capable cells
         { 0 | 1 < NC Iu MODE ONLY CAPABLE CELL LIST : NC Iu Mode Only Cell
List struct > }
         { 0 | 1 < GPRS 3G Additional Measurement Parameters Description 2 :
           < GPRS 3G Additional Measurement Parameters Description 2 struct >>}
         { null | 0 bit ** = < no string >   -- Receiver compatible with earlier
release
         | 1   -- Additions in Rel-6 :
           < 3G_CCN_ACTIVE : bit (1) >
           { null | 0 bit ** = < no string >   -- Receiver compatible with earlier
release
         | 1   -- Additions in Rel-7 :
           { 0 | 1 < 700_REPORTING_OFFSET : bit (3) >
             < 700_REPORTING_THRESHOLD : bit (3) > }
           { 0 | 1 < 810_REPORTING_OFFSET : bit (3) >
             < 810_REPORTING_THRESHOLD : bit (3) > }
           { null | 0 bit** = <no string > -- Receiver backward compatible with
earlier version
           | 1            -- Additions for Rel-8
           < E-UTRAN_CCN_ACTIVE : bit (1) >
           { 0 | 1 < Individual Priorities : < Individual Priorities IE >> }
           { null | 0 bit** = <no string > -- Receiver backward compatible with
earlier version
           | 1            -- Additions for Rel-9
           < TGT_PSHO_SUPPORT : bit (1) >
           < PCCN_TGT_PSHO_SUPPORT : bit (1) >
           < padding bits > } } } } } } ;
```

2: PACKET CELL CHANGE ORDER information element details

TGT_PSHO_SUPPORT (1 bit field)
This field indicates whether the indicated target cell
supports inbound handover for mobile stations in packet
transfer mode. If set to '1', the target cell does not
support inbound handover; if set to '0', the support is not
known.
PCCN_TGT_PSHO_SUPPORT (1 bit field)
This field indicates whether the indicated target cell in
the most recently transmitted PACKET CELL CHANGE
NOTIFICATION message supports inbound handover for mobile
stations in packet transfer mode. The coding is as for the
TGT_PSHO_SUPPORT parameter.

In the above detailed example, there are fields for TGT_PSHO_SUPPORT and PCCN_TGT_PSHO_SUPPORT. In some embodiments, for example specific to CSG cells, the message might not include both TGT_PSHO_SUPPORT and PCCN_TGT_PSHO_SUPPORT in this message, since this would only be useful if the PCCO target and the cell in the PCCN were different and both were CSG cells, which is very unlikely; it would be sufficient to have just the TGT_PSHO_SUPPORT. However, in more a more general case, it could be beneficial to have both.

Target Cell Sends Indication of Handover Support

In some embodiments, the mobile station receives an indication from the target cell controller. In a normal handover, typically the target cell controller constructs a message (HANDOVER COMMAND or similar) which is destined for the MS, and this message is sent back to the serving cell controller and transmitted to the MS while the MS is still in the serving cell. Here, instead of a normal handover command, the target cell generates a message which indicates that handover in the normal sense is not supported.

Specific Physical Layer Addresses Assigned to Cells Supporting Handover

In some embodiments, across a whole network, specific physical layer addresses are assigned only to those cells which do support handover. By examining the physical layer address of a cell, the mobile station can determine whether the cell supports inbound handover or not. This information may be broadcast, for example, in a similar way to the PSC (primary scrambling code)/PCI (physical cell identity) split used to identify whether a cell is a CSG cell. This may, for example, be sent within broadcast system information in one or more cells and defined to be valid across a whole network, and as such can be used by the mobile station for as long as it remains in the network. Alternatively, the device can be provisioned with this information e.g. by using OMA DM (Open Mobile Alliance device management).

Absence of Response to PCCN Notification Indicates Inbound Handover to Target Cell not Supported In some embodiments, the mobile station is configured to send a message, referred to herein as a packet cell change notification in respect of the target cell to a serving cell controller known to support outbound handover to the target cell to inform the serving cell that the mobile station is about to perform a cell change. The Packet Cell Change Notification message defined in 11.2.3a of 3GPP TS 44.060 is a specific example, but this embodiment is not limited to that specific definition. In this embodiment, the serving cell controller responds with a handover command (or other similar message generated by the target cell controller), or other response generated by the serving cell controller (such as packet cell continue message to name a specific example) only if inbound handover is supported by the target cell. The absence of the response is an indication by the network that the target cell does not support inbound handover. By not receiving a handover command, or other message in response, the mobile station can conclude that the target cell does not support inbound handover.

MS Maintains History of Inbound Handover Support

In some embodiments, having determined that a given cell does not support inbound handover, for example using one or more of the methods described above, the mobile station stores this information for future use. For example, it may be stored in association with information that allows it to be associated with the same target cell in the future notwithstanding the fact that physical layer address information for the cell may not be unique. This may for example be context information learned about the cell, for example what other neighbor cells can be detected etc. In some embodiments, this stored information is stored with time-limited validity, due to the possibility that information or status related to a target cell (such as its capability, location or physical layer identity) may change.

Uses of Handover Capability information

An MS may determine the handover capability of a target cell, for example using one of the methods described above. Having learned of the handover capability of a target cell, various uses of this information are provided. As in the above embodiments, in some cases, these uses are applied to uncontrolled cells, or particular type of uncontrolled cells, and more generally, these uses may be applied to any type of cell. However, the benefits may be more significant uncontrolled cells.

In order to avoid unnecessary SI acquisition, reporting, and unsuccessful handover preparation attempts, various behaviours by the MS are provided, in the case where the MS knows/learns that inbound handover is not supported in respect of a target cell.

Uses of Handover Capability information: MS Indicates Handover Support in Communication to Serving Cell Controller In some embodiments, the MS will indicate the handover support information for a given target cell in a communication sent to the serving cell controller. Specific examples of communications that might be used to send this handover support information include measurement reports, a message containing an indication of the MS being within coverage of an uncontrolled cell, a packet cell change notification message.

Packet Cell Change Notification

A packet cell change notification message is a message sent by the MS to the serving cell indicating that the MS is (unless it receives any command to the contrary) about to change cells. An example is the Packet Cell Change Notification message defined in 11.2.3a of 3GPP TS 44.060, but other implementations are possible, and the embodiment described is not limited to the particular definition. An example of a cell change notification procedure is found in 8.8.3 of 3GPP TS 44.060, but other procedures may be employed.

In some embodiments, if the packet cell change notification message is sent in respect of a target cell that is an uncontrolled cell such as a CSG cell, it indicates whether or not inbound handover is supported for the indicated target cell.

The mobile station's knowledge of support of inbound handover in a target system may be limited by its fingerprinting capabilities, for example, in identifying the target cell. However, the mobile station may take account of i) previously received indications (e.g. in a packet cell change order message), ii) information received in system information from the target cell.

If the packet cell change notification message is sent in respect of an uncontrolled cell, such as a target CSG cell and inbound handover is not supported for the indicated target cell the mobile station does not acquire system information for the target cell (if not already acquired) and/or does not include system information in the packet cell change notification message or in another message defined for sending the system information.

The following is a specific example of a packet cell change notification message format, that includes the inbound handover support shown as changes from the PCCN message defined in 11.2.3a of 3GPP TS 44.060. Example information element details are also provided shown as changes to 11.2.3a.

This message is sent on the PACCH by the mobile station to the network to inform the network that the cell reselection criteria are now fulfilled and that the mobile station has entered cell change notification mode.

Message type: PACKET CELL CHANGE NOTIFICATION

Direction: mobile station to network

TABLE 11.2.3a

1: PACKET CELL CHANGE NOTIFICATION message content

```
< Packet Cell Change Notification message content > ::=
< Global TFI : < Global TFI IE > >
{ 0  < ARFCN : bit (10) >
  < BSIC : bit (6) >
| 10      -- Extension in Rel-6 and an escape bit for future extensions of the
message added:
  < 3G Target Cell : < 3G Target Cell Struct >> } -- Re-selection with a 3G cell
as the preferred target cell
| 110     -- Extension in Rel-8 for E-UTRAN and an escape bit for future
extensions of the message
  { 0 | 1 < ARFCN : bit (10) >
    < BSIC : bit (6) > }
  { 0 | 1 < 3G Target Cell : < 3G Target Cell Struct >> }
  { 0 | 1 < E-UTRAN Target Cell : < E-UTRAN Target Cell Struct >> }
  { 0 | 1 < E-UTRAN CCN Measurement Report : < E-UTRAN CCN Measurement Report
struct > > }
| 1110 -- Extension in Rel-9 for CSG cells and an escape bit for future
extensions of the message
  { 0 | 1 < 3G CSG Target Cell : < 3G Target Cell Struct >> }
  { 0 | 1 < E-UTRAN CSG Target Cell : < E-UTRAN Target Cell Struct >> }
  < PS_HO_SUPPORT : bit (2) >
  { 0 | 1 < E-UTRAN CCN Measurement Report : < E-UTRAN CCN Measurement Report
struct > > }
! < Message escape : { 1111} bit (*) = <no string> > }
{ 0< BA_USED : bit > | 1 < PSI3_CHANGE_MARK : bit(2) > }
< PMO_USED : bit >
< PCCN_SENDING : bit (1) >
< CCN Measurement Report : < CCN Measurement Report struct > >
{ null | 0  bit** = < no string > -- Receiver compatible with earlier release
| 1       -- Addition in Rel-6
{ 0 | 1 < 3G_BA_USED : bit > }
< 3G CCN Measurement Report : < 3G CCN Measurement Report struct > >
< padding bits > };
```

2: PACKET CELL CHANGE NOTIFICATION information element details
PS_HO_SUPPORT (2 bit field)

| Bit 2 | Bit 1 | |
|---|---|---|
| 0 | 0 | PS Handover capability of target cell not known |
| 0 | 1 | Target cell supports PS Handover |
| 0 | 1 | Target cell does not support PS Handover |
| 1 | 1 | Reserved (if received, interpreted as 0 0 ) |

Uses of Handover Capability information at MS: Omit Measurement Report for Target Cell In some embodiments, having learned that a given target cell does not support inbound handover, the MS omits measurement report or equivalent for that cell. In some cases, the MS omits measurement reports or equivalents for that cell if the only permitted mechanism for cell change while any ongoing connections remain active (e.g. prior to the reception of a Channel Release message or similar in the case of an ongoing voice call) is by means of handover. Other mechanisms for cell change that are not by means of handover may be available. Unlike handover as defined herein, these other mechanisms do not involve allocating resources in the target cell in advance of the cell change. The measurement report for the target cell can still be included in the case where there is another mechanism for the cell change. An examples of a mechanism for such cell change is cell change order (wherein a packet cell change order message is sent by the network).

Uses of Handover Capability Information at MS: Omit Acquisition/Transmission of Target Cell's SI In some embodiments, having learned that a given target cell does not support inbound handover, the MS omits acquisition of the target cell's broadcast SI and/or omits transmitting to the serving cell information extracted from the SI of the target cell.

Uses of Handover Capability Information at MS: Omit Performing SI Acquisition when Requested by the Serving Cell if the Target Cell does not Support Inbound Handover In some embodiments, the MS omits performing SI acquisition when requested by the serving cell if the target cell does not support inbound handover.

Uses of Handover Capability Information in MS: Implement Differing Behaviour Depending on Knowledge of Handover Capability In some embodiments, if the MS does not know whether the target cell supports handover, the MS assumes that it does. In some embodiments, three separate behaviours are defined. A first behaviour is performed where the mobile station knows inbound mobility is supported for the target cell. A second behaviour is performed where the mobile station knows inbound mobility is not supported for the target cell. A third behaviour is performed in other cases which may involve assuming that the target cell supports handover, or assuming that the target cell does support handover.

Since deployment of uncontrolled cells is likely to be very volatile, the boundaries may also be probabilistic (i.e. it is not required that the mobile station be absolutely certain of its information).

Uses of Handover Capability Information in Serving Cell—
do not Initiate Handover In some embodiments, the network does not initiate the handover procedure (for example a PS Handover) if the packet cell change notification message or other communication from the mobile station (other examples given above) indicated a handover (for example PS Handover) is not supported for the target cell.

Uses of Handover Capability Information in Serving Cell—
Omit Ordering SI Acquisition for Target Cell In some embodiments, if informed (either explicitly or implicitly) by the MS that a target cell does not support handover, the serving cell does not order SI acquisition for that cell, and/or request information from the MS (for example such as that which may be derived from the system information of the target cell) that would be needed for the serving cell to initiate a handover procedure.

Uses of Handover Capability Information in Serving Cell—
Use Alternative Cell Change Mechanism In some embodiments, if informed (either explicitly or implicitly) by the MS that a target cell does not support handover (handover as defined herein involving the allocation of resources in the target cell prior to cell change), an alternative mechanism of achieving the cell change is employed/attempted that does not involve allocation of resources in the target cell prior to the cell change. Specific examples include use of a PCCC/PCCO, or one of the approaches taught in the above-referenced co-pending U.S. application Ser. No. <TBD> filed the same day as this application, and entitled "Methods of Performing Cell Change Without Receiving Description of Resources in a Target Cell", hereby incorporated by reference in its entirety.

Uses of Handover Capability Information in Serving Cell—
Store the Information for Future Use In some embodiments, the serving cell controller stores the handover capability information and uses this information to determine whether to make SI acquisition requests, perform handover preparation, etc. for future requests for the same cell. Physical layer identifiers may not uniquely identify a target cell within the coverage area of the serving cell; therefore, this information should be used with caution; for example, associated with a short validity time, or combined with other context information (such as contemporary or near-contemporary measurement reports relating to other cells by the same MS) to reduce the risk of mistaken identity.

Figure 2:
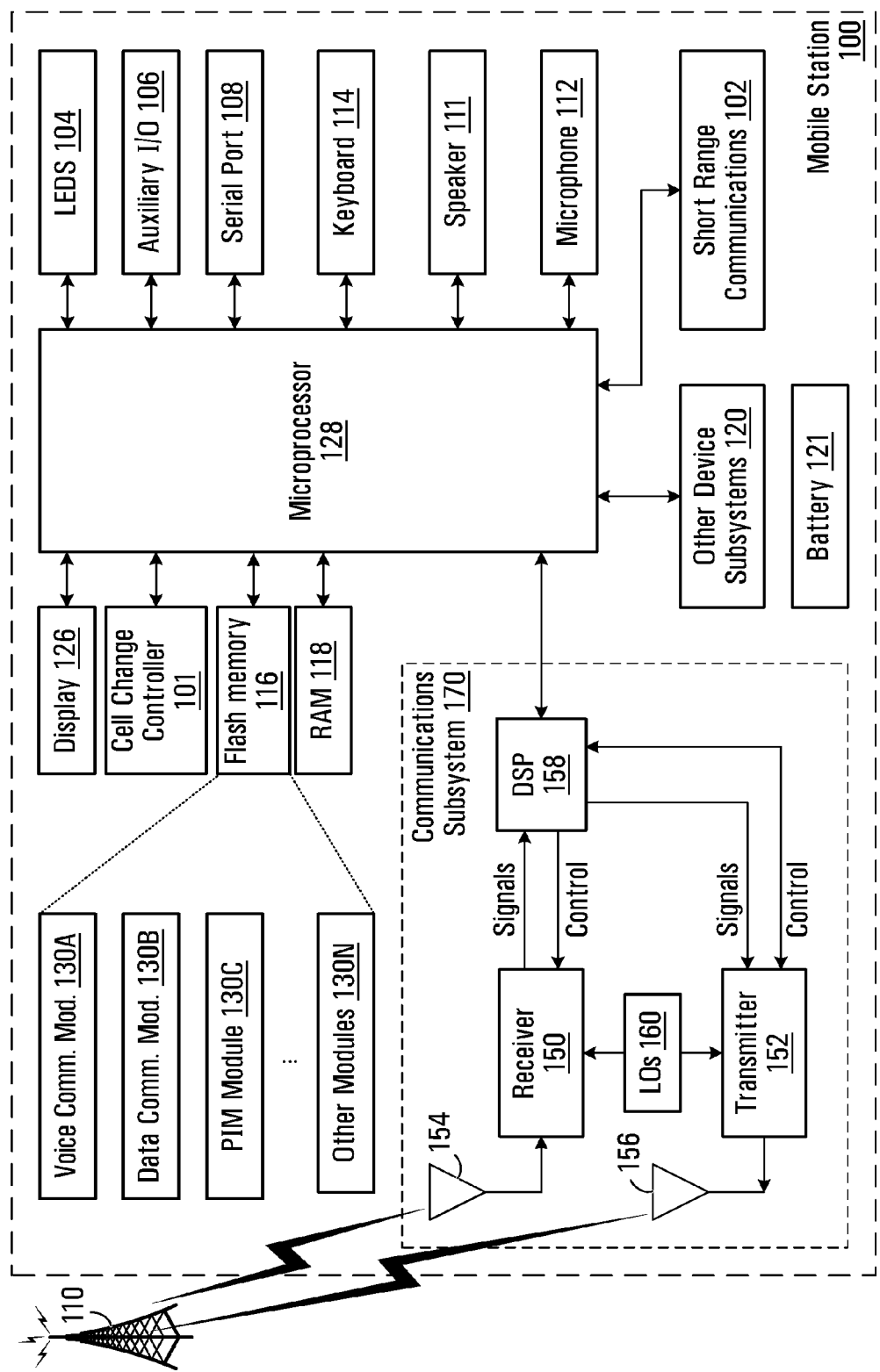
FIG. 2 is a block diagram of a mobile station.

Referring now to FIG. 2, shown is a block diagram of another mobile station 100 that is configured to perform one or a combination of the mobile station implemented methods described in this disclosure. The mobile station 100 is shown with a cell change controller 101 for implementing features similar to those of the cell change controller 24 of the mobile station 10 of FIG. 1. It is to be understood that the mobile station 100 is shown with very specific details for exemplary purposes only.

A processing device (a microprocessor 128) is shown schematically as coupled between a keyboard 114 and a display 126. The microprocessor 128 controls operation of the display 126, as well as overall operation of the mobile station 100, in response to actuation of keys on the keyboard 114 by a user.

The mobile station 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile station 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile station 100 may have a battery 121 to power the active elements of the mobile station 100. The mobile station 100 is in some embodiments a two-way radio frequency (RF) communication device having voice and data communication capabilities. In addition, the mobile station 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile station 100 may also be stored to the RAM 118.

The microprocessor 128, in addition to its operating system functions, enables execution of software applications on the mobile station 100. A predetermined set of software applications that control basic device operations, such as a voice communications module 130A and a data communications module 130B, may be installed on the mobile station 100 during manufacture. In addition, a personal information manager (PIM) application module 130C may also be installed on the mobile station 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The specific design and implementation of the communication subsystem 170 is dependent upon the communication network in which the mobile station 100 is intended to operate. For example, the communication subsystem 170 of the mobile station 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16

WiMAX network. Other types of data and voice networks, both separate and integrated, may also be utilized with the mobile station 100.

Network access may vary depending upon the type of communication system. For example, in the Mobitex™ and DataTAC™ networks, mobile stations are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile station 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile station 100. In addition, the display 126 may also be utilized in voice communication mode, for example, to display the identity of a calling party, the duration of a voice call, or other voice call related information.

The short-range communications subsystem 102 enables communication between the mobile station 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Those skilled in the art will recognize that a mobile device may sometimes be treated as a combination of a separate ME (mobile equipment) device and an associated removable memory module. Accordingly, for purpose of the present disclosure, the terms "mobile device" and "communications device" are each treated as representative of both ME devices alone as well as the combinations of ME devices with removable memory modules as applicable.

Also, note that a communication device might be capable of operating in multiple modes such that it can engage in both CS (Circuit-Switched) as well as PS (Packet-Switched) communications, and can transit from one mode of communications to another mode of communications without loss of continuity. Other implementations are possible.

Some of the embodiments described can be implemented in the context of one or more of the following standards, all of which are incorporated by reference in their entirety:

3GPP TS 44.060 (latest version is v.9.2.0) "General Packet Radio Service (GPRS); Mobile Station (MS)—Base Station System (BSS) interface; Radio Link Control/Medium Access Control (RLC/MAC) protocol".

3GPP TS 45.008: "Radio subsystem link control". (latest version is v.9.1.0)

3GPP TS 44.018 "Mobile radio interface layer 3 specification; Radio Resource Control Protocol". (latest version is 9.3.0)

3GPP TS 48.008 "Mobile Switching Centre—Base Station System (MSC-BSS) interface; Layer 3 specification" (latest version is 9.1.0)

3GPP TS 43.129 Packed-switched handover for GERAN A/Gb mode; Stage 2 (defines Handover Preparation; latest version is 9.0.0)

3GPP TS 48.018 "General Packet Radio Service (GPRS); Base Station System (BSS)—Serving GPRS Support Node (SGSN); BSS GPRS protocol (BSSGP)" (more PS Handover stuff; latest version is 9.0.0)

Numerous modifications and variations of the present invention are possible in light of the above teachings. It is therefore to be understood that within the scope of the appended claims, the invention may be practiced otherwise than as specifically described herein.

We claim:

1. A method for a mobile station, the method comprising:
the mobile station transmitting to a serving cell controller a notification in advance of a cell change to a particular target cell;
the mobile station determining whether inbound handover is supported in the particular target cell by receiving an indication via a wireless network of the possibility of inbound handover being carried out in respect of the target cell;
wherein receiving the indication comprises receiving a packet cell change continue message containing the indication, the packet cell change continue message being a message sent by the wireless network to the mobile station to command the mobile station to continue cell reselection.

2. The method of claim 1 wherein receiving an indication via a wireless network of the possibility of handover being carried out in respect of a target cell comprises:
receiving an indication directly from the target cell of whether inbound handover is supported in the target cell.

3. The method of claim 2 wherein receiving an indication from the target cell of whether inbound handover is supported in the target cell comprises receiving the indication as part of system information broadcast by the target cell.

4. The method of claim 1 wherein receiving an indication via a wireless network of the possibility of handover being carried out in respect of a target cell comprises:
receiving an indication from a serving cell of the mobile station.

5. The method of claim 4 wherein receiving the indication comprises:
receiving a packet cell change order message containing the indication.

6. The method of claim 1 wherein receiving an indication via a wireless network of the possibility of handover being carried out in respect of a target cell comprises receiving information defining an association between specific physical layer addresses and handover support, the method further comprising:
determining a physical layer address of the target cell;
determining whether inbound handover is supported in the target cell based on the physical layer address and the association.

7. The method of claim 6 wherein receiving the information defining the association comprises receiving the information as part of broadcast system information.

8. The method of claim 1 further comprising:
receiving an indication from the serving cell controller that handover from the serving cell to cells of a category to which the target cell belongs is supported by the serving cell controller.

9. The method of claim 1 comprising:
determining whether inbound handover is supported in a particular target cell using the method of claim 1;
maintaining a history of whether inbound handover is supported in the particular target cell.

10. The method of claim 9 wherein:
maintaining a history comprises storing an indication of whether handover is supported in a particular target cell in association with context information with which the target cell can be identified in the future.

11. The method of claim 9 further comprising:
applying a time limited validity to the history for the particular target cell.

12. The method of claim 11 comprising:
receiving an indication from the serving cell controller that handover from the serving cell to cells of a category to which the target cell belongs is supported by the serving cell controller.

13. A method for a mobile station, the method comprising:
the mobile station determining whether inbound handover is supported in a particular target cell by:
transmitting to a serving cell controller a notification in advance of a cell change to the target cell;
upon receiving a response to the notification, the mobile station determining whether inbound handover is supported in the target cell based on an indication provided with the response, the response being a packet cell change continue message sent to the mobile station to command the mobile station to continue cell reselection; and
in absence of a response to the notification, treating the absence of a response to the notification as an indication by the serving cell controller that inbound handover in the target cell is not supported in the target cell.

14. The method of claim 13 comprising:
determining whether inbound handover is supported in a particular target cell using the method of claim 13;
maintaining a history of whether inbound handover is supported in the particular target cell.

15. A method for a serving cell controller, the method comprising:
receiving from a mobile station a notification in advance of a cell change to a target cell;
attempting a handover preparation in respect of the target cell;
receiving an indication that handover is not supported in the target cell; and
sending an indication to the mobile station that handover is not supported in the target cell;
wherein sending the indication comprises sending a packet cell change continue message containing the indication, the packet cell change continue message being a message sent to the mobile station to command the mobile station to continue cell reselection.

16. The method of claim 15 wherein sending an indication to a mobile station that a handover preparation attempt in respect of a target cell failed because the handover is not supported in the target cell comprises sending a packet cell change order message containing the indication.

17. A method for a mobile station, the method comprising:
the mobile station transmitting to a serving cell controller a notification in advance of a cell change to a particular target cell;
the mobile station determining whether inbound handover is supported in the particular target cell by receiving an indication via a wireless network of the possibility of inbound handover being carried out in respect of the target cell;
wherein receiving the indication comprises receiving a packet cell change order containing the indication, the packet cell change order being a message sent by the wireless network to the mobile station to command the mobile station to leave a current cell and change to the target cell.

18. A method for a mobile station, the method comprising:
the mobile station determining whether inbound handover is supported in a particular target cell by:
transmitting to a serving cell controller a notification in advance of a cell change to the target cell;
upon receiving a response to the notification, the mobile station determining whether inbound handover is supported in the target cell based on an indication provided with the response, the response being a packet cell change order sent to the mobile station to command the mobile station to leave a current cell and change to the target cell; and
in absence of a response to the notification, treating the absence of a response to the notification as an indication by the serving cell controller that inbound handover in the target cell is not supported in the target cell.

19. A method for a serving cell controller, the method comprising:
receiving from a mobile station a notification in advance of a cell change to a target cell;
attempting a handover preparation in respect of the target cell;
receiving an indication that handover is not supported in the target cell; and
sending an indication to the mobile station that handover is not supported in the target cell;
wherein sending the indication comprises sending a packet cell change order containing the indication, the packet cell change order being a message sent to the mobile station to leave a current cell and change to the target cell.

* * * * *